(12) United States Patent
Takane

(10) Patent No.: US 7,944,487 B2
(45) Date of Patent: May 17, 2011

(54) IMAGE PICKUP APPARATUS AND IMAGE PICKUP METHOD

(75) Inventor: Yasuo Takane, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 962 days.

(21) Appl. No.: 11/085,203

(22) Filed: Mar. 22, 2005

(65) Prior Publication Data
US 2005/0213847 A1 Sep. 29, 2005

(30) Foreign Application Priority Data
Mar. 29, 2004 (JP) ................................ 2004-096559

(51) Int. Cl.
*H04N 5/217* (2011.01)
(52) U.S. Cl. ..................................... 348/241
(58) Field of Classification Search ............ 348/208.1, 348/208.99, 241
See application file for complete search history.

(56) References Cited

U.S. PATENT DOCUMENTS

| | | | | |
|---|---|---|---|---|
| 4,757,385 A | * | 7/1988 | Hieda | 348/241 |
| 4,918,528 A | * | 4/1990 | Oohashi | 348/625 |
| 5,276,519 A | * | 1/1994 | Richards et al. | 348/241 |
| 5,384,602 A | * | 1/1995 | Bossaert et al. | 348/628 |
| 6,538,691 B1 | * | 3/2003 | Macy et al. | 348/222.1 |

FOREIGN PATENT DOCUMENTS

| | | | |
|---|---|---|---|
| JP | 6-292207 A | | 10/1994 |
| JP | 6-350877 A | | 12/1994 |
| JP | 11-250240 | * | 9/1999 |
| JP | 11-250240 A | | 9/1999 |
| JP | 11-252431 A | | 9/1999 |
| JP | 11-275391 A | | 10/1999 |
| JP | 2003-189169 A | | 7/2003 |
| JP | 2003-198880 A | | 7/2003 |

* cited by examiner

*Primary Examiner* — Timothy J Henn
*Assistant Examiner* — Joel Fosselman
(74) *Attorney, Agent, or Firm* — Birch, Stewart, Kolasch and Birch, LLP

(57) ABSTRACT

The present invention provides an image pickup apparatus and an image pickup method capable of suppressing degradation of the picture quality caused by correction of optical distortion. A distortion correction circuit corrects optical distortion contained in digital image data obtained by photographing conducted via a lens. Correction coefficients (gain) are set by a CPU so as to increase a correction quantity of contour correction as a quantity of correction for the optical distortion increases. Contour correction using the correction coefficients set by the CPU is conducted on the digital image data corrected in optical distortion.

3 Claims, 7 Drawing Sheets

F I G. 1
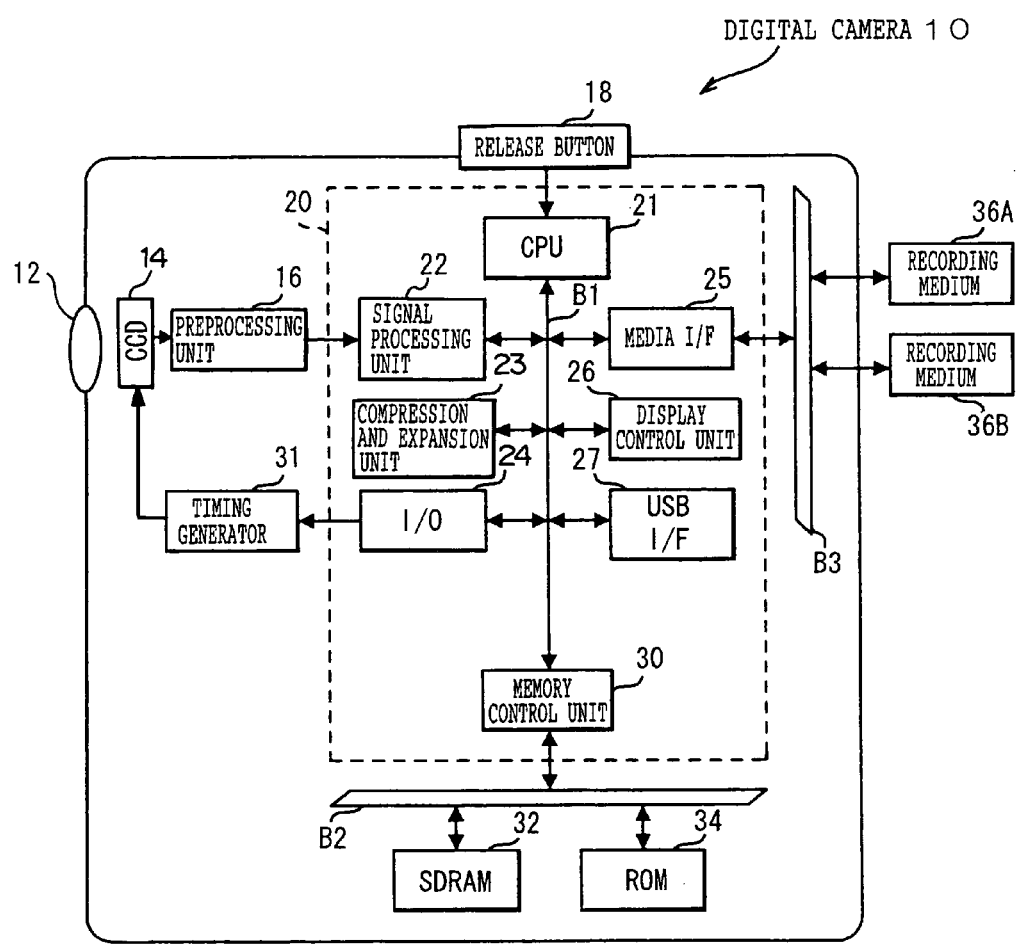

LUMINANCE SIGNAL Y BEFORE CONTOUR
CORRECTION PROCESSING

EDGE PULSE

LUMINANCE SIGNAL Y' AFTER CONTOUR
CORRECTION PROCESSING

PINCUSHION DISTORTION

BARREL DISTORTION

IMAGE PICKUP APPARATUS AND IMAGE PICKUP METHOD

CROSS-REFERENCE TO RELATED APPLICATION

This application claims priority under 35USC 119 from Japanese Patent Application No. 2004-96559, the disclosure of which is incorporated by reference herein.

BACKGROUND OF THE INVENTION

1. Field of the Invention

The present invention relates to an image pickup apparatus and an image pickup method. In particular, the invention relates to an image pickup apparatus and an image pickup method for correcting optical distortions contained in image information obtained by image picking up via an optical lens, and conducting contour correction on the image information.

2. Description of the Related Art

In an image pickup apparatus that picks up an image of a subject through an optical lens of a silver film camera or a digital camera and acquires an image which represents the subject, distortion is caused around the acquired image due to refraction. This distortion is typically called optical distortion. The lens used in the image pickup apparatus is formed so as to cancel the optical distortion. In the case of a zoom lens, however, it is difficult to conduct correction at both the tele-end and the wide end with the same lens configuration, and large optical distortion is apt to occur. In a single-focus lens as well, lenses of expensive materials or an increase in lens in the configuration is needed to conduct correction. Thus it is difficult to obtain a thin inexpensive lens configuration, and so optical distortion remains. In this way, it is difficult to make the distortion characteristic of the lens used in the image pickup apparatus equal to 0% because of cost and size limitations. It is considered that about 1% is visually adequate.

In the case where an acquired image is recorded on a film as in a silver film camera, correction of the image after recording is impossible and the optical distortion depends upon the lens performance. On the other hand, in the case where an image is acquired in the form of digital data and recorded on a recording medium as in the digital camera, it is possible to correct the image by computation processing even after recording. In the field of digital camera, therefore, techniques concerning optical distortion correction have been proposed heretofore.

Here, optical distortion is classified into two kinds, i.e., "pincushion distortion" in which corner portions of an image extend outside as shown in FIG. 6A and "barrel distortion" in which conversely the corner portions contract as shown in FIG. 6B. It is generally known that the distortion quantity (displacement quantity) depends on the distance from the optical center in both types. In other words, if the displacement quantity is linear, merely compression or expansion would occur. As a matter of fact, however, the displacement quantity is nonlinear as shown in FIG. 6C. In the case of a positive displacement quantity, each pixel is displaced to a position moved from the original position so as to be further away from the center, resulting in the "pincushion distortion." In the case of a negative displacement quantity, each pixel is displaced to a position moved from the original position so as to be nearer the center, resulting in the "barrel distortion."

As a conventional technique for correcting such optical distortion, there is a method for obtaining the correction quantity at coordinate on an image, storing the correction quantities in advance in a memory, and conducting linear interpolation on the basis of the stored correction quantities to correct respective pixels (for example, see Japanese Patent Application Laid-Open (JP-A) No. 6-292207). In this technique, however, the memory for storing the table of the correction quantities needs to have a storage capacity that depends upon the image size. As the image size becomes large, the storage capacity needed in the memory also becomes large, resulting in a reduction in the area available for work and an increase in price.

A technique contrived to solve the problem is a method of representing the correction quantity by using an approximation and conducting correction. In other words, it is generally known that the displacement quantity of the optical distortion can be approximately represented using a polynomial. The reciprocal of this polynomial is used as a correction formula. In this technique, it is not necessary to retain the correction quantities at respective coordinates in a table. So long as the parameters (coefficients of the polynomial) are stored in the memory, all coordinates of an image before and after correction can be associated by computation (for example, see JP-A No. 11-252431). There is also a technique of storing different parameters for every focal distance, selecting the parameters according to the focal distance of the image taken, and conducting a correction in order to cope with different focal distances at the tele-end and the wide end (for example, see JP-A No. 11-275391). In addition, there is also a technique of increasing the speed of the correction processing by converting digital image data (RGB data) to YUV data, thinning the UV data in the YUV data, and then conducting a correction (for example, see JP-A No. 11-250240).

Application software executed in a computer (PC) includes application software for conducting optical distortion correction processing. Therefore, it is also possible to correct the optical distortion by transferring image data picked up by a digital image pickup apparatus to a PC and executing the application software on the PC side. However, effort is required for installing application software in the PC to conduct the optical distortion correction processing and effort is required for transferring digital image data to be corrected onto the PC (i.e., into the RAM incorporated in the PC). For reducing the work burden imposed on photographers, therefore, it is desirable to conduct the correction on the digital image pickup apparatus, as in the above-described techniques.

In the above-described distortion correction, correction is conducted for optical distortion so as to obtain an image having a uniform distortion factor over the whole picture. The optical distortion becomes larger as the position moves from the center portion of the optical lens toward the peripheral portions. In most techniques for correcting the optical distortion therefore, including the above-described techniques, a coordinate transform for making the movement quantity larger as the position moves from the center portion of an image indicated by image data obtained via the optical lens toward the peripheral portion (interpolation computation based on several nearby points) is conducted. This results in a problem that the change of frequency response becomes notable on moving from the central portion toward the peripheral portion of the image according to the image data after correction and consequently the picture quality is degraded.

For example, when the coordinate transform involves pixel interpolation, the movement quantity of a pixel GH (on FIG. 7), which is obtained by the pixel interpolation, based on the optical distortion becomes larger as the point moves from the center portion of the image toward the peripheral portion. This problem occurs regardless of whether the optical distortion is pincushion distortion or barrel distortion.

SUMMARY OF THE INVENTION

The present invention has been made in view of the above circumstances and provides an image pickup apparatus capable of suppressing the degradation of picture quality caused by the correction of the optical distortion.

A first aspect of the invention is to provide: a distortion correction component, for correcting optical distortion contained in image information obtained by photographing conducted via an optical lens; a setting component, for setting correction coefficients so as to increase a correction quantity of contour correction as a quantity of correction for the optical distortion conducted by the distortion correction component increases; and, a contour correction component for conducting contour correction using the correction coefficients set by the setting component, on an image represented by the image information corrected in optical distortion by the distortion correction component.

In the first aspect, optical distortion contained in image information obtained by photographing conducted via an optical lens is corrected by the distortion correction component. As a technique for the correction, all techniques for correcting optical distortion, such as techniques using a distortion correction table, and techniques for deriving the information indicated by such a table, but without actually providing such a table, by means of computation using a high-order function and the like can be applied.

In the invention, correction coefficients are set by the setting component so as to increase a correction quantity of contour correction as a quantity of correction for the optical distortion conducted by the distortion correction component increases. Contour correction using the correction coefficients set by the setting component is conducted on an image represented by the image information corrected in optical distortion by the distortion correction component. As a result, picture quality degradation caused by the correction of the optical distortion can be suppressed.

It is not always necessary for the setting component in the invention to set the correction coefficients in the entire region of the image represented by image information. It is also possible to set correction coefficients in a region where optical distortion contained in the image information exceeds a predetermined threshold. For example, it is also possible not to set correction coefficients in a region below a predetermined threshold at which distortion appearing in the image poses visually little problem, and to set correction coefficients only in a region exceeding the predetermined threshold. As a result, the handled information quantity is decreased and consequently the speed of processing can be increased.

As described above, the optical distortion increases as the position moves from the center portion of the lens to the peripheral portion. Typically, however, the image takes a rectangular shape having a horizontal length longer than a vertical length. Therefore, distortion appearing in the image is greater in the horizontal direction of the image than that in the vertical direction.

In view of this point, the setting component sets the correction coefficients independently in each of a vertical direction and a horizontal direction of an image represented by the image information. For example, in the vertical direction in which distortion appearing in the image becomes less than that in the horizontal direction, the correction quantity for the optical distortion corrected by the correction component becomes less than that in the horizontal direction of the image. Therefore, it is possible to set the correction coefficients so as to make the correction coefficients in the vertical direction less than those in the horizontal direction. As a result, the handled information quantity is decreased and consequently the speed of processing can be increased.

Since the image pickup apparatus according to the invention has the above-described configuration, the picture quality degradation caused by the correction in optical distortion can be suppressed.

BRIEF DESCRIPTION OF THE DRAWINGS

FIG. 1 is a block diagram showing a configuration of a digital camera according to an embodiment of the present invention.

DETAILED DESCRIPTION OF THE INVENTION

Figure 2:
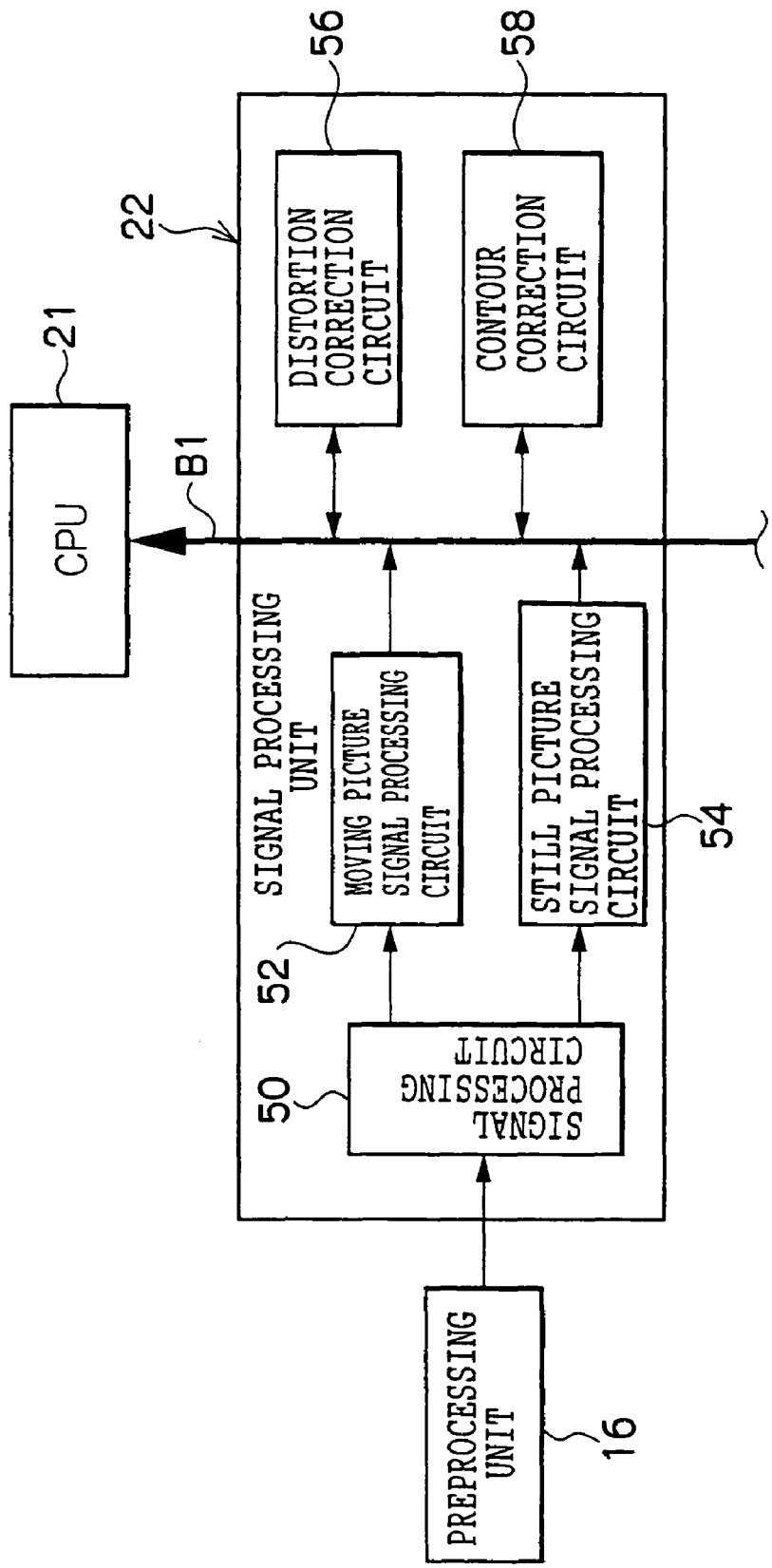
FIG. 2 is a block diagram showing a configuration of a signal processing unit according to an embodiment of the invention.

Hereafter, an embodiment of the present invention will be described in detail with reference to the drawings. Here, a case where the image pickup apparatus of the invention is applied to a digital camera will be described.

First, a configuration of a digital camera 10 according to the embodiment will now be described with reference to FIG. 1. As shown in FIG. 1, the digital camera 10 includes: a lens 12, for forming an image of a subject; a charge coupled device (hereafter referred to as "CCD") 14, disposed to the rear on an optical axis of the lens 12; a preprocessing unit 16, for conducting analog signal processing of various kinds such as CDS (correlated double sampling processing) on an input analog signal and then converting the analog signal to digital data; a release button 18, operated by pressing when executing photographing; a main control unit 20, for taking overall charge of the operation of the digital camera 10; and a timing generator 31, for generating a synchronization signal for the CCD 14.

The main control unit 20 includes: a CPU (central processing unit) 21, serving as a setting component; a signal processing unit 22, for conducting digital signal processing of various kinds on input digital data; a compression and expansion unit 23, for conducting compression processing on input uncompressed digital data by using a predetermined compression format (JPEG format in the present embodiment) and conducting expansion processing on input compressed digital data by using an expansion format associated with the compression format, and an input-output control unit (hereafter referred to as "I/O") 24 for taking charge of information exchange with units disposed outside the main control unit 20.

The main control unit 20 further includes: a media interface, (hereafter referred to as "media I/F") 25 for controlling access to attached recording media; a display control unit 26, for generating a signal to display a subject image and a menu picture on a liquid crystal display and supplying the signal to the liquid crystal display; a USB (Universal Serial Bus) interface (hereafter referred to as "USB I/F") 27; and a memory control unit 30, for controlling access to an internal memory.

The CPU 21, the signal processing unit 22, the compression and expansion unit 23, the I/O 24, the media I/F 25, the display control unit 26, the USB I/F 27 and the memory control unit 30 are connected to each other via a bus B1.

Therefore, the CPU 21 can: control operation of the signal processing unit 22 and the compression and expansion unit 23; exchange information with various units via the I/O 24; access the attached recording media via the media I/F 25; display information of various kinds on the liquid crystal display via the display control unit 26; conduct mutual communication based on the USB standard with an external apparatus via the USB I/F 27, and access the internal memory via the memory control unit 30.

The release button 18 is connected to the CPU 21. The CPU 21 can always be aware of the state of pressing operation conducted on the release button 18.

An input end of the signal processing unit 22 is connected to an output end of the CCD 14 via the preprocessing unit 16. An output end of the I/O 24 is connected to an input end of the CCD 14 via the timing generator 31. Therefore, an analog signal representing a subject image output from the CCD 14 by picking up an image of the subject is subjected to analog signal processing of various kinds in the preprocessing unit 16, and then converted to digital image data. The digital image data is input to the signal processing unit 22, subjected to digital signal processing of various kinds therein, and then stored temporarily in the internal memory (particularly a SDRAM 32 described later) via the memory control unit 30. The image pickup operation conducted by the CCD 14 at this time is conducted in synchronism with a synchronization signal generated by the timing generator 31 as a result of control exercised by the CPU 21 via the I/O 24.

The digital camera 10 includes an SDRAM (Synchronous DRAM) 32 and a ROM 34 as internal memories. These memories are connected to the memory control unit 30 via a bus B2. Therefore, the CPU 21 can access the SDRAM 32 and the ROM 34 via the memory control unit 30 and the bus B2.

Two pieces of recording media, i.e., a recording medium 36A and a recording medium 36B, can be installed in the digital camera 10. These recording media are connected to the media I/F 25 via a bus B3 in the state in which they are attached to the camera. Therefore, the CPU 21 can access the recording medium 36A and the recording medium 36B via the media I/F 25 and the bus B3. In the digital camera 10 according to this embodiment, SmartMedia is used as the recording medium 36A and CompactFlash is used as the recording medium 36B.

In the embodiment, the main control unit 20 is formed as a single-chip LSI (Large Scale Integrated circuit). As a result, the digital camera 10 is reduced in size, raised in reliability, and lowered in cost.

Hereafter, principal parts will be described in detail.

The lens 12 includes a zoom lens group, a focus lens, and a lens moving mechanism for moving them in the optical axis direction. The lens 12 is formed as a zoom lens (optical unit) in which the focal distance can be changed (variable power).

The lens 12 is connected to an A/F control circuit. Under the control of the A/F control circuit, the zoom lens group is moved in the optical axis direction so as to attain a desired zoom magnification (variable focal length lens), and the focus lens is moved in the optical axis direction so as to form an image on a light sensing plane of the CCD 14 by using incident light representing the subject image passed through the lenses (automatic focusing (AF) mechanism). As a result, the CCD 14 picks up an image of the subject on the basis of the incident light representing the subject image passed through the lens 12, and outputs an analog image signal representing the subject image.

In this embodiment, the so-called TTL (Through The Lens) system is adopted. In the TTL system, the lens position is adjusted so as to maximize the contrast of the image obtained by photographing using focusing control. Focusing control is automatically conducted so as to place the subject, which exists in a predetermined position (AF frame) in the photographing area, in focus. Specifically, in the case where a still picture photographing mode for photographing a still picture is selected by operation of a mode changeover switch conducted by a photographer, focusing control is automatically conducted by pressing the release button 18 by half. On the other hand, in the case where a moving picture photographing mode for photographing a moving picture is selected, focusing control is conducted continuously after photographing is started by fully pressing the release button 18.

Photographing using the CCD 14 is conducted in the case where a photographing mode for photographing a still picture or a moving picture has been selected (the still picture photographing mode or the moving picture photographing mode). Specifically, if the still picture photographing mode is selected and the release button 18 is fully pressed, photographing is conducted once with a predetermined shutter speed and a predetermined exposure, and a still picture representing the subject image is photographed. In other cases moving picture photographing in which a continuous photographing result using the CCD 14 is output is made possible i.e., when in standby for still pictures, with the still picture photographing mode selected, or standby for moving pictures, with the moving picture photographing mode selected, or where the moving picture photographing mode is selected and the release button 18 is fully pressed.

As shown in FIG. 2, the signal processing unit 22 includes: a signal processing circuit 50, for conducting predetermined digital signal processing on input digital image data regardless of whether the picture is a still picture or a moving picture; a moving picture signal processing circuit 52, for conducting predetermined digital signal processing on digital image data representing a moving picture; and a still picture signal processing circuit 54, for conducting predetermined digital signal processing on digital image data representing a still picture. The signal processing unit 22 further includes: a distortion correction circuit 56, serving as a distortion correction component for correcting optical distortion contained in digital image data obtained by photographing via the lens 12; and a contour correction circuit 58, serving as a contour correction component for conducting contour emphasis correction on digital image data corrected in optical distortion by the distortion correction circuit 56.

The moving picture signal processing circuit 52, the still picture signal processing circuit 54, the distortion correction circuit 56 and the contour correction circuit 58 are connected to the bus B1 as well. In other words, in the main control unit 20, the signal processing unit 22 and the CPU 21 are connected to each other via the bus B1.

In the signal processing unit 22, the digital image data supplied from the preprocessing unit 16 is first input to the signal processing unit 50. In the signal processing circuit 50, the digital image data is subjected to correction processing of various kinds such as white balance control, gamma correction and sharpness correction, and Y/C conversion processing for converting RGB data (image data respectively of colors R (red), G (green) and B (blue)) to Y/C signals (a luminance signal Y and chroma signals Cr and Cb).

An output end of the signal processing circuit 50 is connected to the moving picture signal processing circuit 52 and the still picture signal processing circuit 54. The digital image data, subjected to correction processing of various kinds and YC conversion in the signal processing circuit 50, is input to the moving picture signal processing circuit 52 and the still picture signal processing circuit 54.

The digital image data processed by the moving picture signal processing circuit 52 or the still picture signal processing circuit 54 is input to the distortion correction circuit 56 via the bus B1.

Parameters (coefficients of a polynomial) representing the polynomial that approximates to a displacement quantity of optical distortion are stored in advance in the distortion correction circuit 56. The distortion correction circuit 56 corrects optical distortion contained in the input digital image data, by using these parameters.

Specifically, the displacement quantity caused by optical distortion can be represented approximately by using a multi-dimensional function F(d) of a distance d from an image center (optical center). Supposing that coordinates of a pixel in an image after correction are (x, y) (where x and y are integers), therefore, coordinates (X, Y) of the corresponding pixel in the image before correction are represented by the following formula.

$$(X, Y) = (x \times F(d), y \times F(d)), d = (x^2 + y^2)^{1/2}$$

Once the coordinates (X, Y) in the image before the correction corresponding to the coordinates (x, y) in the image after the correction are obtained, correction on the optical distortion can be conducted by moving a pixel data P located on the coordinates (X, Y) in the image before the correction to the coordinates (x, y) in the image after the correction. Typically, however, the coordinates (X, Y) in the image before the correction obtained by using the formula do not become integer values, and corresponding pixel data do not exist in the image before the correction.

Therefore, it is necessary to find pixel data corresponding to the found coordinates (X, Y) in the image before the correction by applying interpolation to the pixel data really existing near the coordinates (X, Y) in the image before the correction. As the interpolation method in this case, for example, the nearest neighbor interpolation and the bi-linear interpolation can be mentioned.

In other words, the optical distortion can be corrected by using the pixel data found by conducting interpolation in accordance with an interpolation method such as the nearest neighbor interpolation or the bi-linear interpolation, as pixel data at the coordinates (x, y) in the image after the correction.

In the distortion correction circuit 56, bi-linear interpolation is used as the interpolation method.

Figure 3:
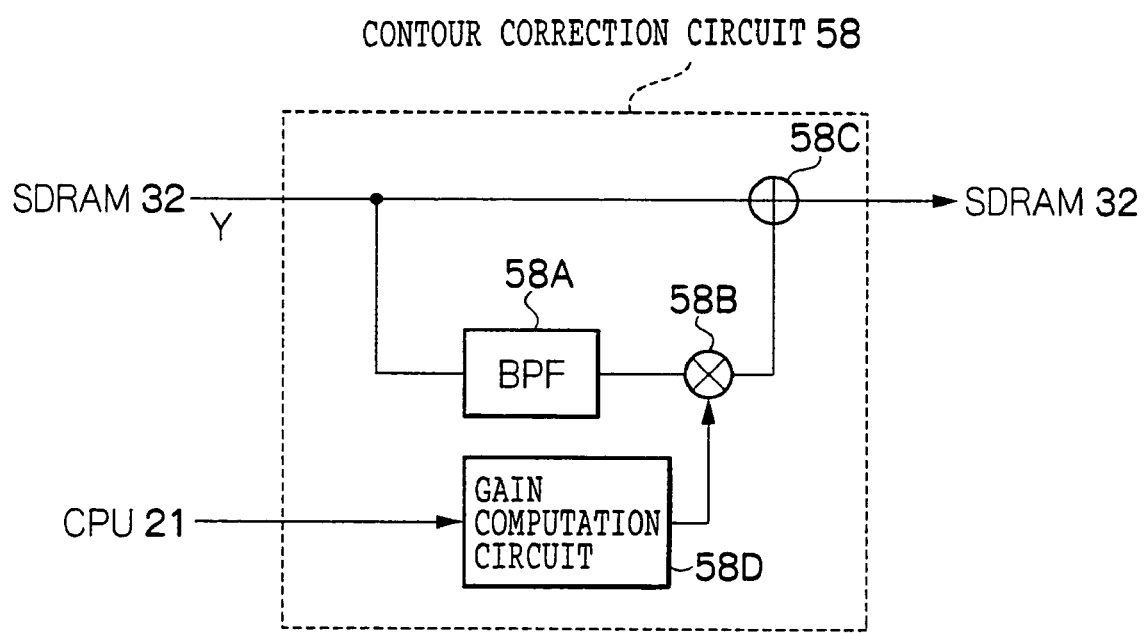
FIG. 3 is a block diagram showing a configuration of a contour correction circuit according to an embodiment of the invention.

A configuration of the contour correction circuit 58 according to the embodiment will now be described with reference to FIG. 3. As shown in FIG. 3, the contour correction circuit 58 includes a band pass filter (hereafter referred to as "BPF") 58A for passing through a predetermined high frequency band, a multiplier 58B, an adder 58C, and a gain computation circuit 58D.

The gain computation circuit 58D computes a gain, which indicates the degree of the contour correction, on the basis of a data signal indicating the correction coefficients, which will be described in detail later.

Figure 4A:
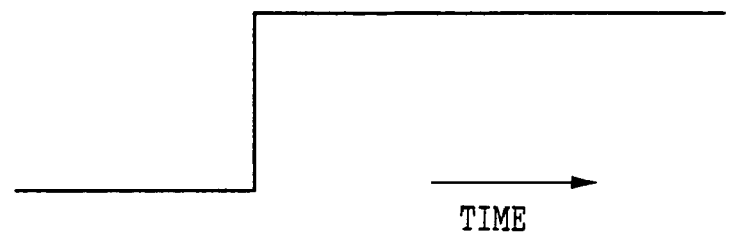
FIGS. 4A to 4C are waveform diagrams showing the operation of a contour correction circuit according to an embodiment of the invention.
Figure 4B:
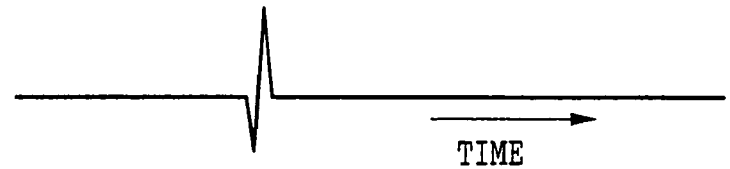

The BPF 58A is supplied with the luminance signal Y stored in the SDRAM 32. The BPF 58A extracts a component in a predetermined high frequency band from the luminance signal Y to the multiplier 58B. For example, if the input luminance signal Y assumes a state shown in FIG. 4A, a pulse corresponding to an edge position (hereafter referred to as "edge pulse") of the luminance signal Y as shown in FIG. 4B is output from the BPF 58A to the multiplier 58B. In other words, the BPF 58A functions to extract contour portions in the subject image represented by the luminance signal Y.

The multiplier 58B multiplies the edge pulse input from the BPF 58A by the gain computed by the gain computation circuit 58D on the basis of the data signal, which represents the correction coefficients, and outputs a result to one input end of the adder 58C supplied with the luminance signal Y at the other input end.

Figure 4C:
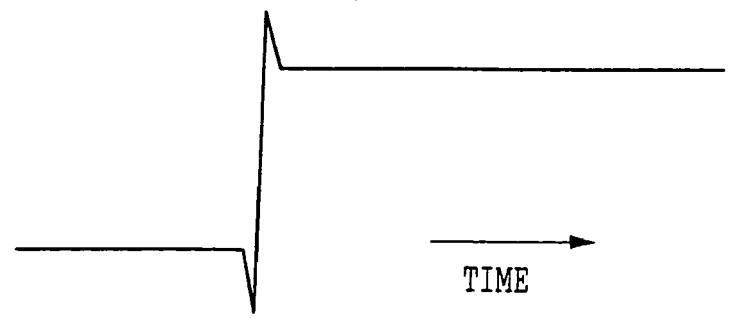

In the adder 58C, therefore, the edge pulse amplified by the multiplier 58B in accordance with the gain is added to the input luminance signal Y. As an example, a luminance signal Y' with the contour of the image (subject image) emphasized as shown in FIG. 4C is generated, output, and stored in the SDRAM 32.

In the digital camera 10 according to this embodiment, the parameters (coefficients of a polynomial) representing the polynomial that approximates to the correction coefficients for emphasizing the image contour are stored in advance in a register in the CPU 21. By using a polynomial (computation formula) represented by the parameters, a data signal representing correction coefficients corresponding to the position of a pixel to be processed on the image indicated by an input address is output.

Figure 5A:
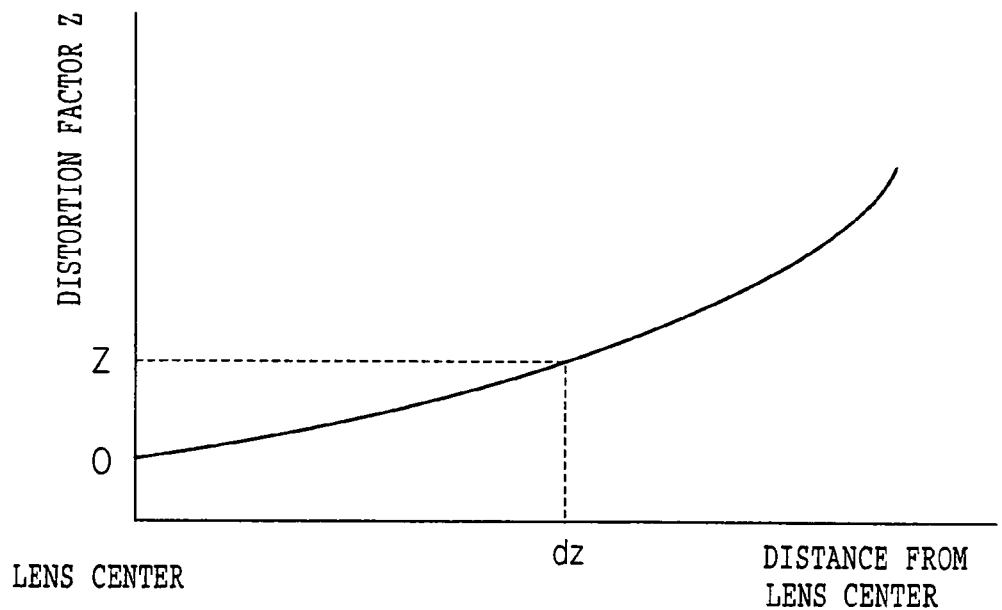
FIG. 5A is a diagram showing a relation between a distance from a center of a lens and an optical distortion factor of the lens.
Figure 5B:
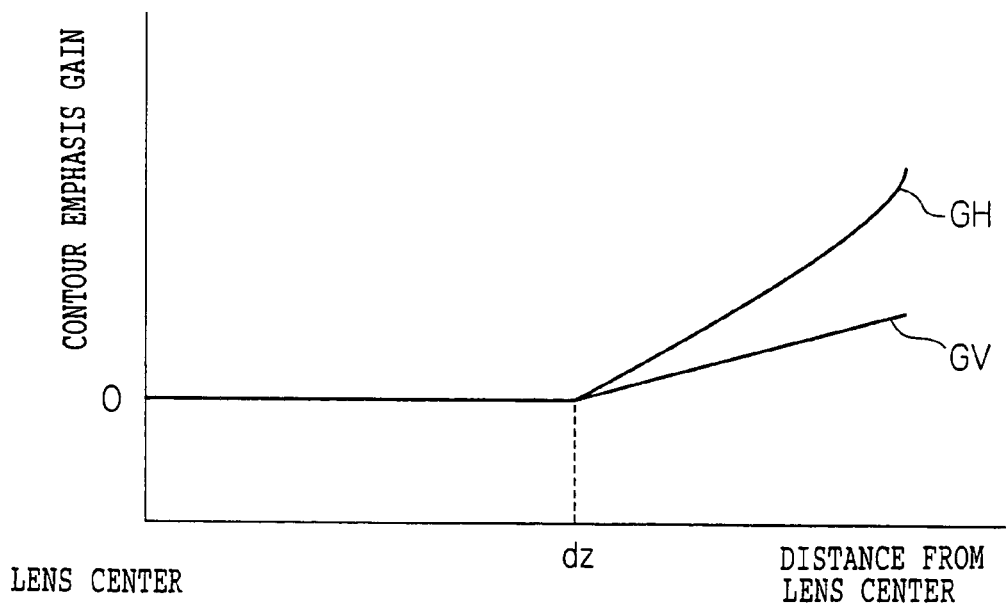
FIG. 5B is a diagram showing a computation formula for computing correction coefficients of contour correction corresponding to FIG. 5A.
Figure 6A:
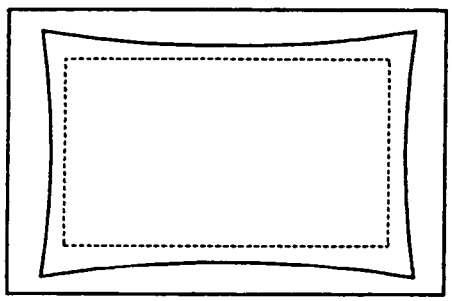
FIG. 6A shows a shape of optical distortion of pincushion distortion.
Figure 6B:
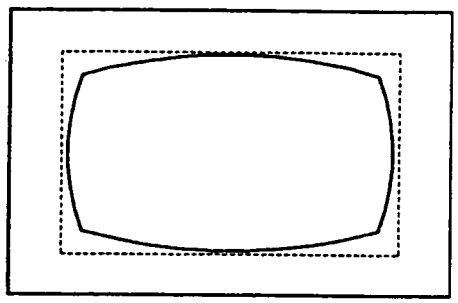
FIG. 6B shows a shape of optical distortion of barrel distortion.
Figure 6C:
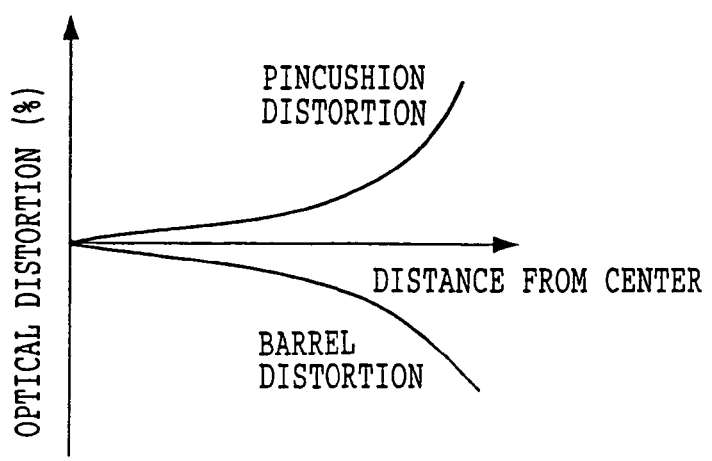
FIG. 6C is a diagram showing displacement quantities of optical distortion in each of the pincushion distortion and the barrel distortion.
Figure 7:
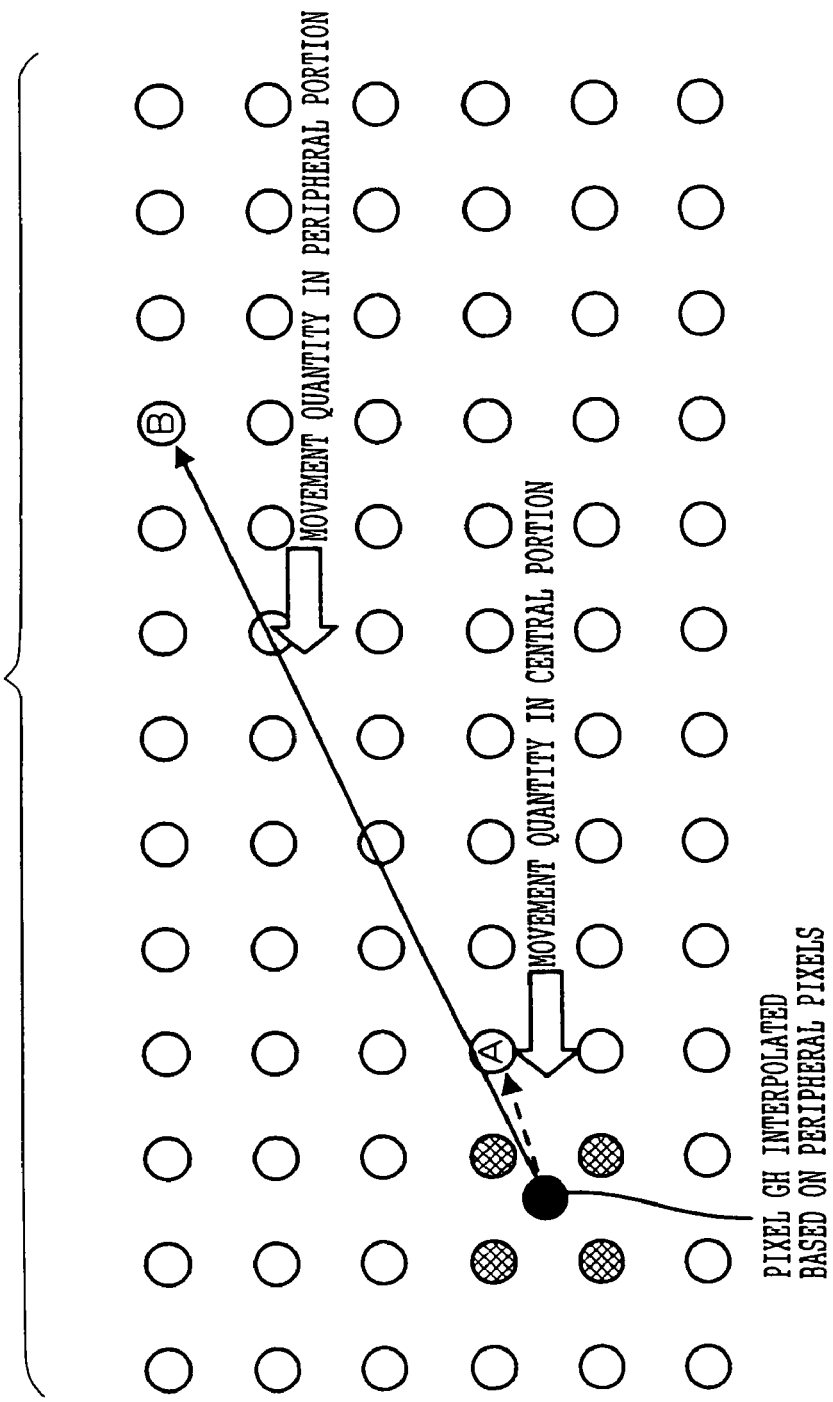
FIG. 7 is a schematic diagram showing a problem of a related art.

It is now supposed that a predetermined threshold at which distortion appearing in the image poses visually little problem is located at the optical distortion factor Z=1% as shown in FIG. 5A. A distance from the lens center corresponding to Z=1% is denoted by dz as shown in FIG. 5A. An example of the computation formula according to the embodiment is shown in FIG. 5B. The polynomial set as the formula does not output correction coefficients in a region below dz, and outputs correction coefficients for computing the contour emphasis gain, in only a region exceeding the predetermined threshold. In the region exceeding the predetermined threshold, the contour emphasis gain increases according to the correction coefficients, as the distance from the lens center increases.

As for the computation formula, a computation formula GH for outputting correction coefficients corresponding to the horizontal direction of the image and a computation GV for outputting correction coefficients corresponding to the vertical direction of the image are set separately. The computation formula GV is set to a polynomial that outputs such correction coefficients so as to produce a smaller contour emphasis gain than the computation formula GH.

On the basis of these computation formulas GH and GV, a data signal, representing correction coefficients for a corresponding position on the image of a pixel to be processed which corresponds to the input address, is output from the register in the CPU 21.

Operation of the digital camera 10 according to the embodiment will now be described.

First, the CCD 14 picks up an image of the subject via the lens 12, and outputs analog signals respectively of R (red), G (green) and B (blue), which represent the subject image, sequentially to the preprocessing unit 16. The preprocessing unit 16 conducts analog signal processing of various kinds, such as CDS, on the analog signals input from the CCD 14, then converts the analog signals to digital image data, and outputs the digital image data to the signal processing unit 22.

The signal processing unit 22 conducts digital signal processing of various kinds, such as the white balance control and gamma correction, on the digital image data input from the preprocessing unit 16, and then conducts Y/C signal processing to produce the luminance signal Y and chroma signals Cr and Cb. The signal processing unit 22 stores these signals in a predetermined region in the SDRAM 32 via the memory control unit as digital image data.

The digital image data stored in the predetermined region in the SDRAM 32 is read out by the distortion correction circuit 56 under the control of the CPU 21, subjected to optical distortion correction by using the above-described technique, and then stored again in a predetermined region in the SDRAM 32.

Thereafter, under the control of the CPU 21, the contour correction circuit 58 conducts contour emphasis correction based on the correction coefficients set by the computation formulas GH and GV on the digital image data which have been corrected in optical distortion and stored in the SDRAM 32.

Specifically, an address indicating the position of a pixel to be processed in contour correction (in this embodiment, an address in the horizontal and vertical direction of a pixel where the pixel located on an upper left edge portion of the subject image represented by digital image data is taken as the start point) is input to the CPU 21. The CPU 21 outputs correction coefficients corresponding to a position of the pixel, on the subject image, represented by the address to the gain computation circuit 58D so as to increase the correction quantity of the contour emphasis correction (the gain input to the multiplier 58B) on the basis of the computation formulas GH and GV as the correction quantity of the optical distortion applied to the pixel by the distortion correction circuit 56 increases.

As a result of the processing heretofore described, on the basis of the computation formulas GH and GV, the adder 58C in the contour correction circuit 58 outputs the luminance signal Y' subjected to the contour emphasis correction using a gain set so as to increase the correction quantity in the contour correction as the quantity of optical distortion correction conducted by the distortion correction circuit 56 increases. Therefore, the luminance signal Y' is written over a value of a corresponding luminance signal Y in the SDRAM 32 and stored.

When processing on all pixels of the digital image data to be processed is finished, then the digital image data corresponding to one subject image, after the optical distortion correction conducted by the distortion correction circuit 56, have been subjected to the contour emphasis correction conducted by the contour correction circuit 58.

The liquid crystal display in the digital camera 10 according to the embodiment is formed so as to be able to be used as a finder, which displays a moving picture (through image) obtained as a result of continuous image pickup conducted by the CCD 14. In the case where the liquid crystal display is used as a finder, the luminance signal Y', subjected to the contour emphasis correction conducted by the contour correction circuit 58, and the chroma signals Cr and Cb are sequentially output to the liquid crystal display via the display control unit 26. As a result, the through image is displayed on the liquid crystal display.

If the user presses the release button 18 by half, the AE function is activated to set the exposure state and then the AF function is activated to exercise the focus control. If the user subsequently fully presses the release button 18, then the luminance signal Y' and the chroma signals Cr and Cb stored in the SDRAM 32 at this point in time are compressed in a predetermined compression format (in this embodiment, JPEG format) by the compression and expansion unit 23, and then recorded on the recording medium 36A or 36B, as set by the user, via the media I/F 25 and the bus B3. As a result, photographing is conducted.

As described in detail heretofore, the digital camera 10 according to the embodiment: corrects optical distortion contained in digital image data, obtained by photographing conducted via the lens 12; sets correction coefficients (gain) so as to increase the correction quantity of the contour correction as the correction quantity for the optical distortion increases; and conducts contour correction, using the correction coefficients thus set, on the digital image data corrected in optical distortion. As a result, degradation in picture quality caused by the optical distortion correction can be suppressed.

The digital camera 10 according to the embodiment sets correction coefficients only in a region where optical distortion contained in the digital image data exceeds a predetermined threshold (a value corresponding to the distance dz from the lens center associated with the optical distortion factor Z=1%). Therefore, the handled information quantity is decreased and consequently the speed of processing can be increased.

In the vertical direction where distortion appearing in the image is less than that in the horizontal direction, the correction quantity for the optical distortion corrected by the distortion correction circuit 56 becomes less than that in the horizontal direction of the image. Therefore, the digital camera 10 according to this embodiment sets correction coefficients independently in each of the vertical and horizontal directions of the image represented by digital image data, and sets the correction coefficients so as to make the correction coefficients in the vertical direction less than those in the horizontal direction. Additionally as a result of this, the handled information quantity is decreased and consequently the speed of processing can be increased.

In the description of this embodiment, the correction coefficients according to the invention are derived by using the computation formulas (GH and GV) in which the computation result becomes large according to the distance of the pixel to be processed from the center of the subject image. Alternatively, it is also possible to use, for example, a look up table (LUT) assigning correction coefficients indicated by the computation formulas (GH and GV) and output correction coefficients corresponding to a position on the subject image of a pixel to be processed, according to an input address. In this case, the load for computation using the computation formulas can be decreased and still faster processing becomes possible.

In the description of this embodiment, the case where the CPU 21 is involved in the contour correction processing conducted by the contour correction circuit 58 has been described. The invention is however not restricted to this. It is also possible to prevent the CPU 21 from being involved by, for example, providing a second processor in the signal processing unit 22 and making the second processor execute the contour correction processing. In this case, the load on the CPU 21 can be reduced.

The optical distortion correction technique used in the distortion correction circuit 56 is not limited to the technique described in this embodiment. All existing techniques for correcting optical distortion, such as the technique using the above-described distortion correction table, can be applied.

The configurations of the digital camera 10 and the contour correction circuit 58 (see FIGS. 1 to 3) are nothing but examples. The configurations can be changed suitably without departing from the spirit of the invention.

For example, it is also possible to provide plural BPFs differing in characteristics in the contour correction circuit 58 for conducting the contour correction, combine the BPFs, and execute the contour correction. In such a case, it is also possible to detect the zoom position (focal distance) and change the proportions of combinational addition for plural BPFs so as to conduct the contour correction according to the distortion factor and focal distance of the lens 12.

What is claimed is:

1. An image pickup apparatus comprising:
   a distortion correction component for correcting optical distortion contained in image information obtained by photographing conducted via an optical lens;
   a setting component for outputting correction coefficients for emphasizing image contour so as to increase a correction quantity of contour correction as a quantity of correction for the optical distortion conducted by the distortion correction component increases; and
   a contour correction component for conducting contour correction using the correction coefficients output by the setting component, on an image represented by the image information corrected in optical distortion by the optical distortion correction component, wherein
   the setting component outputs the correction coefficients for emphasizing an image contour only in regions where optical distortion contained in the image information exceeds a predetermined threshold,
   the setting component outputs the correction coefficients corresponding to the horizontal direction of the image that are output from a first polynomial and the correction coefficients corresponding to the vertical direction of the image that are output from a second polynomial, the first polynomial and the second polynomial are set independently from each other, and the first polynomial and the second polynomial are set so that the correction coefficients corresponding to the vertical direction of the image have smaller values than the corresponding correction coefficients corresponding to the horizontal direction of the image, and
   the predetermined threshold is a value corresponding to a distance from the lens center wherein an optical distortion factor is at least 1%.

2. An image pickup method comprising:
   (a) correcting optical distortion contained in image information obtained by photographing conducted via an optical lens;
   (b) outputting correction coefficients for emphasizing image contour so as to increase a correction quantity of contour correction as a quantity of correction in (a) increases; and
   (c) conducting contour correction using the correction coefficients output in (b), on an image represented by the image information corrected in optical distortion in (a), wherein
   in (b) for emphasizing an image contour only in regions where optical distortion contained in the image information exceeds a predetermined threshold and the correction coefficients are output by outputting the correction coefficients corresponding to the horizontal direction of the image that are output from a first polynomial and the correction coefficients corresponding to the vertical direction of the image that are output from a second polynomial, and the first polynomial and the second polynomial are set independently from each other, and the first polynomial and the second polynomial are set so that the correction coefficients corresponding to the vertical direction of the image have smaller values than the corresponding correction coefficients corresponding to the horizontal direction of the image, and
   the predetermined threshold is a value corresponding to a distance from the lens center wherein an optical distortion factor is at least 1%.

3. The image pickup method according to claim 2, wherein the correction coefficients are set so as to have smaller values in the vertical direction as compared with the horizontal direction.

* * * * *